United States Patent

[11] 3,613,661

| | | | | |
|---|---|---|---|---|
| [72] | Inventor | Nayan S. Shah | | |
| | | 1414 E. 59th ST., Chicago, Ill. 60637 | | |
| [21] | Appl. No. | 785,521 | | |
| [22] | Filed | Dec. 20, 1968 | | |
| [45] | Patented | Oct. 19, 1971 | | |

[54] MECHANICALLY CONTROLLING FLOW THROUGH LIVING BODY DUCTS
14 Claims, 7 Drawing Figs.

[52] U.S. Cl. .................................................. 128/1 R,
128/326, 128/334 R, 128/346, 251/4
[51] Int. Cl. ........................................................ A61b 17/00,
A61b 17/08, A61b 17/12
[50] Field of Search ........................................... 128/1, 325,
326, 346, 334, 334 B; 251/4, 9

[56] References Cited
UNITED STATES PATENTS

| | | | |
|---|---|---|---|
| 3,221,746 | 12/1965 | Noble ........................... | 128/334 R |
| 3,120,230 | 2/1964 | Skold ............................ | 128/346 |
| 3,166,819 | 1/1965 | Robbins ........................ | 128/325 X |
| 3,392,722 | 7/1968 | Jorgensen .................... | 128/1 |
| 3,334,629 | 8/1967 | Cohn ............................ | 128/325 |

*Primary Examiner* — Channing L. Pace
*Attorney* — Hill, Sherman, Meroni, Gross & Simpson

ABSTRACT: A living body duct may be mechanically blocked in a manner to enable unblocking of the duct when desired, by inserting into the duct a flow-blocking device, and more particularly a device having a valve maintaining the blocked condition of the duct as long as desired and which may be opened to resume normal flow through the duct.

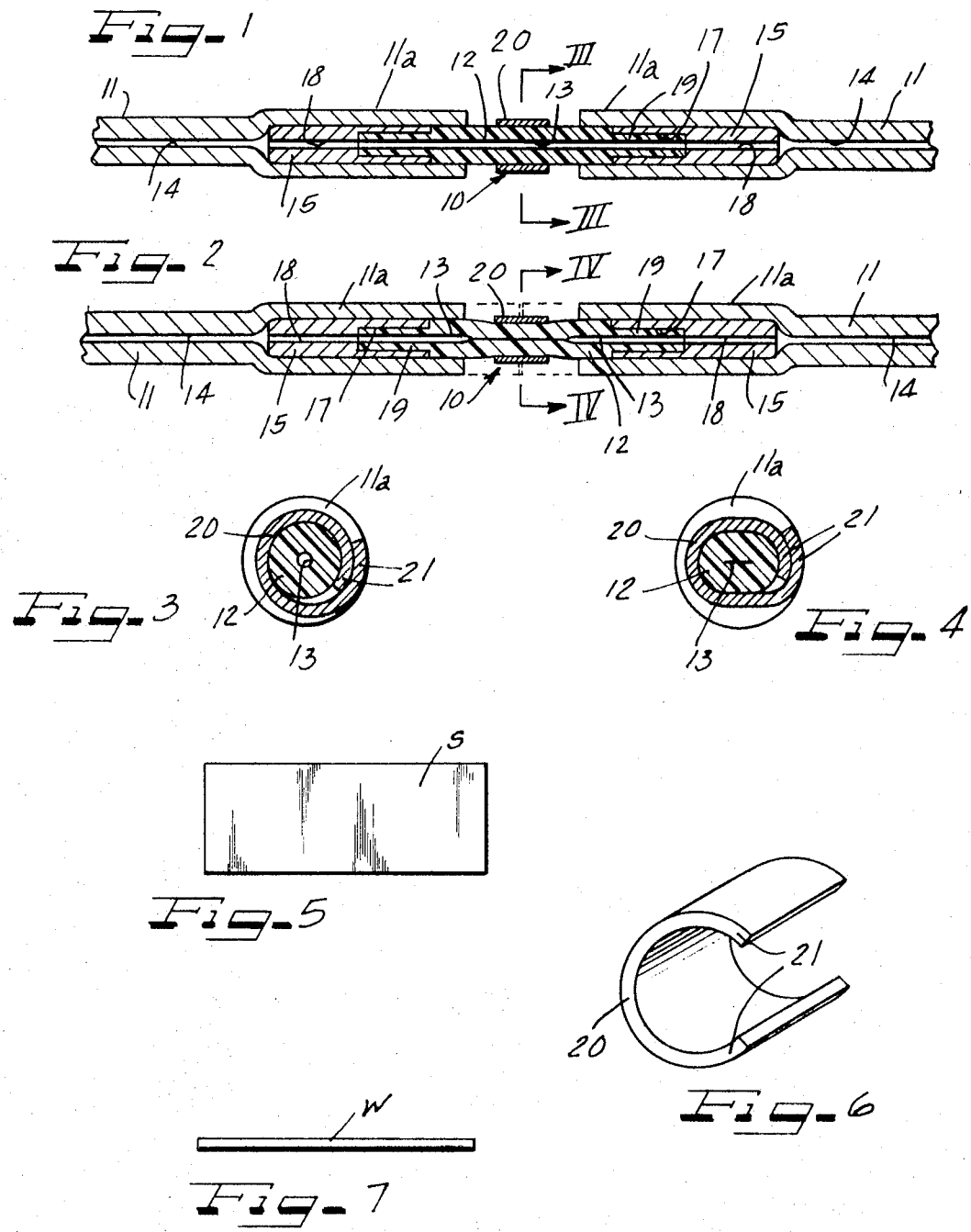

MECHANICALLY CONTROLLING FLOW THROUGH LIVING BODY DUCTS

This invention relates to the control of flow through ducts in living bodies, and is more particularly concerned with the selective blocking and unblocking of such ducts.

Where it is desired to effect a temporary, but indefinite and possibly considerable duration closure or blockage of a body duct, certain problems are encountered. Simply tying off or clamping such a duct is immediately effective, but if permitted to remain for any length of time will result in tissue adherence and permanent closure of the duct by growing together of the adhered tissue of the lumen. If a section of the duct is entirely removed, the section must be of sufficient length to avoid regenerative joining of the resected ends, or at least the upstream end of the duct must be tied off, and in either case permanency of the resection is indicated. Neither of the foregoing expedients permits a simple and immediate resumption of flow through the blocked or disabled duct after an indeterminate period of time which may be of several months' or even years' duration.

In accordance with the principles of the present invention a new and improved method of and means for mechanically blocking a duct in a living body, in a manner to enable unblocking of the duct when desired, are provided.

An important object of the present invention is to provide a new and improved method of mechanically blocking a duct in a living body.

Another object of the invention is to provide new and improved means for blocking a duct in a living body in a manner to enable quick, easy and assured resumption of flow through the duct when desired.

A further object of the invention is to provide a novel method of and means for temporarily blocking a duct in a living body for an indeterminate time interval and which may be accomplished through a simple and quick surgical operation.

Still another object of the invention is to provide novel valve means for insertion in a duct in a living body to control flow through the duct.

Other objects, features and advantages of the present invention will be readily apparent from the following detailed description of certain preferred embodiments thereof taken in conjunction with the accompanying drawing, in which:

FIG. 1 is a schematic longitudinal section through a duct and a blocking device inserted therein;

FIG. 2 is a longitudinal sectional view similar to FIG. 1 but showing the valve portion of the blocking device closed;

FIG. 3 is an enlarged fragmentary transverse sectional view taken substantially on the line III—III of FIG. 1;

FIG. 4 is an enlarged transverse sectional detail view taken substantially on the line IV—IV of FIG. 3;

FIG. 5 is a plan view of a blank from which a clamp member for use with the blocking device is adapted to be made;

FIG. 6 is an isometric view of a clamp member as may be formed up from the blank of FIG. 5; and FIG. 7 is a plan view of a blank for a modified clamping device.

A device 10 embodying features of the invention is constructed as an insert properly dimensioned to be received within end portions 11a of a duct 11 which has been severed to facilitate insertion of the device.

In a desirable construction, the device 10 comprises a central or intermediate tubular body portion 12 which is made from a suitable plastic material which is biologically compatible with living tissue. Such materials are now well known and commonly employed in catheters, prosthesis, and the like, and for the present purpose should be possessed of adequate flexibility to bend and adapt to adjacent muscular movements of the body and to enable pinching the tube closed, but possessed of adequate permanent resilience or memory factor to return to substantially open tubular condition when released from closing pressure. Since a desirable plastic material of this kind is biologically compatible with the surrounding tissue, there is a tendency, generally desirable, for fibrosis to occur in and around the plastic element. In this instance it is desirable that fibrosis and tendency of the severed ends of the duct portions 11a to grow together be encouraged so that the device 10 will assume a substantially implanted relation to the duct 11.

In order to avoid fibrosis blocking of a passage 13 through the tubular body portion 12 of the device, so that there will be a continuous open relationship of the ends of the portion 12 with the passage or lumen 14 of the duct, inhibitor means herein comprising biologically inert extensions 15 are provided on the opposite ends of the plastic body portion 12. Tantalum is a desirable material for the extensions 15. Any suitable means of attaching the extensions 15 to the body portion 12 may be employed, such, for example, as the plug and socket arrangement shown in which each of the metal extensions 15 has a socket 17 in one end portion thereof concentric with a passage 18 through the extension and on the order of diametrical size to the passage 13 and the lumen 14. Fitted within each of the respective sockets 17 is a smaller diameter complementary pluglike end portion 19 on each end of the body member 12. While the socket and plug connections may be simple press fit, any suitable adhesive material may be employed to guarantee against separation. In order to assure that the passage ends of the body portion 12 are sufficiently spaced from the internal tissues of the duct 11, the extensions 15 are of substantial length. For example, the overall length of each of the extensions 15 may be about one-half of the overall length of the body member 12. This assures an adequate space between the remote end of each of the extensions 15 and the inner end of the associated connecting plug 19 of the body portion 12 to inhibit fibrosis blocking of the passageway of the device 10. As will be observed in FIG. 1, by having the total passage 13, 18 through the device 10 on the order of the diameter of the lumen 14, free and uninterrupted flow of fluid and any biologically active or potent elements in such fluid as conducted through the duct 11 is enabled when desired.

For its flow-blocking function, namely, to shut off and close the duct 11 and more particularly the lumen 14 against flow therethrough for a substantial and possibly indeterminate length of time, the body portion 12 is caused to have a valve function. While suitable valve mechanism may be built into the plastic body 12, simple and effective means for the purpose comprise a clamp 20. In a practical form the clamp comprises a biologically inert metal strip S (FIG. 5), such as tantalum. Desirably this strip is at least as long as and preferably longer than the circumference of the body 12, and it may be simply manipulated to wrap it as a band about the body tube 12 (FIGS. 1 and 2) and then by application of squeezing pressure malleably distorted to press, pinch or distort the tube closed or shut (FIGS. 3 and 4). For convenience, the malleable valve strip S may be preformed into a generally C shape with flaring legs having terminal portions 21 turned generally toward one another and adapted to overlap retainingly when, after the open clamp has been applied to receive the body tube 12 within the bight of the clamp, the clamp is bent into encompassing relation to the tube. By applying squeezingly deforming pressure onto the clamp legs and toward one another, the body tube 12 is squeezed into generally oval transverse cross section (FIGS. 3 and 4) and collapsing the wall of the passage 13 against itself into a tightly closed flow-blocking condition. Although because of its malleability, tantalum, for example, may possess very little spring back, the overlapping terminals 21 will serve as a safety interlock to prevent accidental spreading of the clamp legs and thus unintended opening of the passage 13. Further, the overlapping terminals 21 prevent working off or lateral sliding displacement of the clamp relative to the body 12 so that the clamp remains in place and keeps the valve closed until the clamp is deliberately opened. Another advantage of this construction resides in that if it is desired to reopen the passage 13 without removing the clamp 20, application of squeezing pressure across the length of the oval cross section forces the clamp to resume the generally cylindrical original shape of the body tube perimeter so that the passage will reopen by springing apart of the wall provided by the resilient tube.

In another form, the valve clamp may comprise a suitable length of biologically inert wire W, such as tantalum. This may be wrapped about the body 12 of the device, and if the wire is long enough such wrap may be several times around the body tube and win the wraps in closely abutting relation to one another. Thereby much the same result is attained as with the metal strip S and by deformably squeezing the clamp out of round the body tube is similarly deformed and the passage 13 pressed shut. Similarly, the passage may be opened by again deformably manipulating the clamp along the long axis of the oval to return it to generally cylindrical form and thus enable springing open of the passage 13.

To insert the device 10 in the duct 11, a surgical incision is made in the duct-enclosing tissues of the living body at a suitably accessible point along the length of the duct and thereby exposing the portion of the duct into which the device is to be implanted. The duct is then opened as by severing it and the opposite ends of the device inserted into the respective confronting ends of the duct, with the end portions 11a of the duct expanding to receive the device. For this purpose, of course, the outside diameter of the device will be so proportioned relative to the diameter and flexibility of the duct as to enable reception of the device without undue strain on the expanded end portions 11a, and to avoid damage thereto. At their tips, of course the terminals or extensions 15 are chamfered rounded off to facilitate entry into the lumen 14 and expansion of the wall of the duct. If preferred, and in order to maintain lateral flexibility of the body tube 12 during the assembly manipulation of the device with the duct, application of the clamp 20 may be effected after the device has been assembled with the end portions 11a of the duct. However, the device, including the clamp 20 may be, and preferably is fully assembled. If preferred, the severed ends of the duct may be left spaced apart as shown in FIG. 1 and in full line in FIG. 3. However, if it is desired to promote joinder of the severed ends, they may be brought into abutment as shown in dash outline in FIG. 3. After the device 10 has been assembled with the duct, the incision which exposed the affected part of the duct is desirably closed over and about the portion of the duct in a manner to promote rapid healing.

Either before assembly of the device 10 with the duct 11, or after assembly of the device with the duct and before closing the incision, the clamp 20 may be manipulated to close the passage 13. On the other hand, if it is preferred to permit the incision to heal completely or if in respect to the involved duct it would be better to permit free flow through the duct until healing of the incision has been completed, or it is desired to defer blocking of the duct for any reason, the valve clamp 20 may be left in the valve open condition relative to the body tube 12. Then, at the appropriate time for blocking the tube, manipulation of the clamp 20 to squeezingly distort the same to close the valve may be effected, as by means of a suitable tool which will apply the necessary clamping pressure without injury to the surrounding tissues. This deferred blocking manipulation is especially feasible where the involved duct is close to the surface of the living body and is accessible through relatively loose or at least readily pliable skin or tissue overlying the device. Under these conditions, also, it is readily feasible to open the valve when desired, whether the valve was closed when the device was inserted or during the operation of inserting the device, or subsequently as described.

A special utility for the device 10 is for the purpose of controlled male sterilization. For this purpose the device is inserted in the vas deferens. As is known, the lumen diameter of this duct is from about 6 to 10 microns, with the outside diameter of the duct from 0.5 to 1 millimeter. For this purpose, the device may have an overall length of about 2 centimeters with the plastic body 12 having an exposed length of about 1 centimeter and the tantalum terminals having a length of about 0.5 centimeter each. The advantages of the device 10 for family planning when thus utilized are readily apparent.

For controlled female sterilization the device 10 may be inserted in the oviducts. Because of the greater depth at which these ducts are embedded in the body, it may be necessary when it is desired to resume flow through the oviducts, or either of them, to effect another surgical operation to gain access to the valve to open it. However, such reaccess operation will be even less severe than the original implantation operation which is of a relatively minor nature, quickly performed and with minimal tissue damage involvement.

It will be understood that variations and modifications may be effected without departing from the spirit and scope of the novel concepts of this invention.

I claim as my invention:

1. A method of mechanically blocking a duct in a living body in a manner to enable unblocking of the duct when desired, comprising:

making an incision in the body and exposing a portion of the duct;

opening said portion of the duct and permanently implanting in the duct a flow-blocking tubular device equipped with a valve which is operable from outside the body after implantation, and having a passage to assume the function of the affected part of the duct lumen, the passage being openable and closeable by operating the valve;

closing the incision over and about said portion of the duct and the inserted device;

and including selecting for said tubular device materials which will promote fibrosis and healing of the incision and the duct about the device to assure permanency of implantation and which will inhibit fibrosis in said passage and the openings thereof communicating with the duct lumen so that the passage will remain permanently capable of duct flow therethrough in the open condition of the passage even after an extended time of closure of said valve.

2. A method according to claim 1 comprising severing the duct and inserting respective end portions of the tubular device into the severed ends of the duct.

3. A method according to claim 2 comprising expanding said end portions of the duct to receive and grip the end portions of the device.

4. A method according to claim 2 in which the device comprises a tube of plastic material compatible with body tissue and coaxial extension elements carried by and projecting from the respective opposite end portions of the plastic tube and formed from fibrosis-inhibiting material, and effecting insertion of the device into the end portions of the duct to an extent which receives said extension elements fully with the severed ends of the duct encompassing the tube.

5. A method according to claim 1 comprising subsequent to closing and healing of the incision operating the valve of the device by manipulation through the overlying body tissues.

6. A method according to claim 1 comprising closing said valve of the device before closing of the incision, and subsequent to closing and healing of the incision operating the valve of the device by manipulation through the overlying body tissue to effect resumed flow through the passage and through the lumen of the duct.

7. A method according to claim 1 comprising implanting the device in the duct with the valve open and leaving the valve open until the closed incision has completely healed and thereafter closing the valve by manipulation through the surrounding body tissue.

8. A device for mechanically blocking a duct in a living body in a manner to enable unblocking of the duct when desired, comprising a unilinear resilient tubular section adapted to be permanently implanted in a living body duct and having a passage to assume the function of the affected part of the duct lumen;

valve means carried by said section operable for selectively closing said passage; and opposite end portions of said section being constructed of a material which will inhibit fibrosis in said passage and at the openings to said passage from a duct in which the device is implanted so that the passage and portions of the duct contiguous to the ends of the structure will remain permanently capable of duct flow therethrough in the open condition of the passage even after an extended time of closure of the passage by said valve after implantation.

9. A device according to claim 8 in which said section comprises a material which is compatible with body tissue in a substantial length of the section intermediate said end portions.

10. A device according to claim 8 in which said section is intermediate said end portions and is of plastic material supporting said valve, and said end portions comprise metal extensions secured to said intermediate section.

11. A device according to claim 10 in which said metal extensions and said intermediate section have respective end portions telescopically interengaged, and the passage is of substantially uniform diameter throughout its length in said end portions and said section.

12. A device according to claim 8 in which said section comprises a resiliently flexible continuous intermediate plastic tube, and said valve comprises a malleable metal piece wrapped about said tube normally in the form of a generally cylindrical band conforming to the shape of the tube perimeter and being adapted to be squeezed into generally oval transverse cross section to collapse the tube and tightly squeeze the passage closed into flow-blocking condition, said valve being adapted to be squeezed open by pressure across the length of the oval cross section to force it open from its clamping relation to said tube into generally cylindrical original shape so that the passage will reopen by springing apart of the wall provided by said resilient tube.

13. A device according to claim 12 in which said valve piece comprises a metal strip of substantial width having overlapping terminals serving as a safety interlock to prevent accidental spreading of the valve and thus unintended opening of the passage.

14. A device according to claim 12 wherein said metal piece comprises a wire strip which is long enough to be wrapped several times around the tube and with the wraps in closely abutting relation to one another.